United States Patent
Stepney, III et al.

[11] Patent Number: 5,941,484
[45] Date of Patent: Aug. 24, 1999

[54] DUAL-PURPOSE ARROW REST/WRENCH FOR TREE STAND

[76] Inventors: William H. Stepney, III, 168 Isaiah Smith Ln.; Nelson Ryan Dube, 291 Bantam Lake Rd.; William H. Stepney, IV, 25 Anderson Rd., all of Morris, Conn. 06763

[21] Appl. No.: 09/110,327

[22] Filed: Jul. 6, 1998

[51] Int. Cl.⁶ ............................ F16M 11/00; B25B 13/00; E04G 3/00
[52] U.S. Cl. ............................... 248/201; 7/138; 182/187
[58] Field of Search .............................. 248/219.4, 231.71, 248/201, 214, 72, 68.1, 67.5, 67.7, 65, 49, 69; 211/60.1, 85.7; 182/187, 188, 135, 136; 7/138

[56] References Cited

U.S. PATENT DOCUMENTS

| | | | |
|---|---|---|---|
| 905,404 | 12/1908 | Brauer | 211/60.1 |
| 1,398,996 | 12/1921 | Bardera | 7/138 |
| 1,835,935 | 12/1931 | Dean | 248/231.72 |
| 2,640,382 | 6/1953 | Grossman | 81/119 |
| 2,816,696 | 12/1957 | Stockfleth | 224/1 |
| 3,108,725 | 10/1963 | Ramsey | 224/1 |
| 3,291,427 | 12/1966 | Hutchings | 248/201 |
| 3,490,662 | 1/1970 | Ramsey | 224/1 |
| 3,591,062 | 7/1971 | Karbo | 224/1 B |
| 4,059,248 | 11/1977 | Kuntz | 248/214 |
| 4,621,606 | 11/1986 | Toth | 124/24 A |
| 4,823,764 | 4/1989 | Knaack | 124/88 |
| 4,924,544 | 5/1990 | Culotta | 7/138 |
| 5,044,505 | 9/1991 | Spratt | 211/22 |
| 5,044,590 | 9/1991 | Carafice | 248/309.1 |
| 5,076,522 | 12/1991 | Stinson | 248/216.1 |
| 5,265,584 | 11/1993 | Judson et al. | 124/86 |
| 5,310,150 | 5/1994 | Fecko | 248/218.2 |
| 5,437,377 | 8/1995 | Riemenschneider | 211/86 |
| 5,593,121 | 1/1997 | Tuckett | 248/218.4 |
| 5,778,896 | 7/1998 | Seals et al. | 131/181 |
| 5,827,441 | 10/1998 | Solbjorg | 249/91 |

FOREIGN PATENT DOCUMENTS 752176  2/1967  Canada .

*Primary Examiner*—Derek J. Berger
*Assistant Examiner*—Michael Nornberg
*Attorney, Agent, or Firm*—Richard C. Litman

[57] ABSTRACT

The invention is an arrow rest attachment for a tree stand comprising a pair of identical elongated beams, each having a clamp at one end and concave arrow supports along the top surface. Both supports are clamped to the frame of a tree stand's seat, allowing arrows to rest horizontally between them. They may also include a slot at the end opposite the clamp, dimensionally suited to tightening and loosening the nuts normally used on a tree stand.

2 Claims, 3 Drawing Sheets

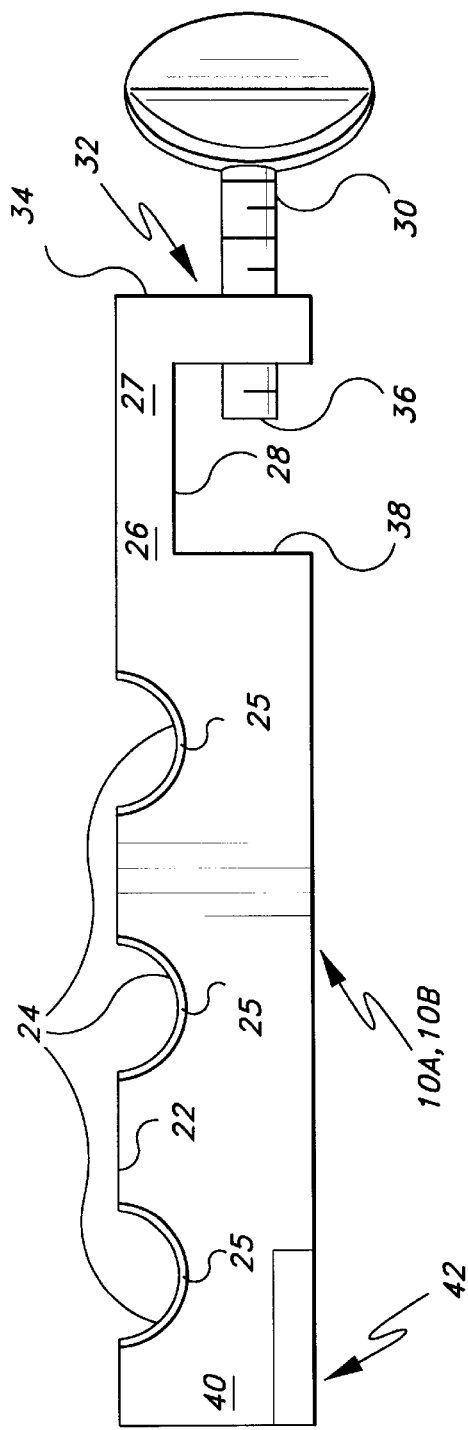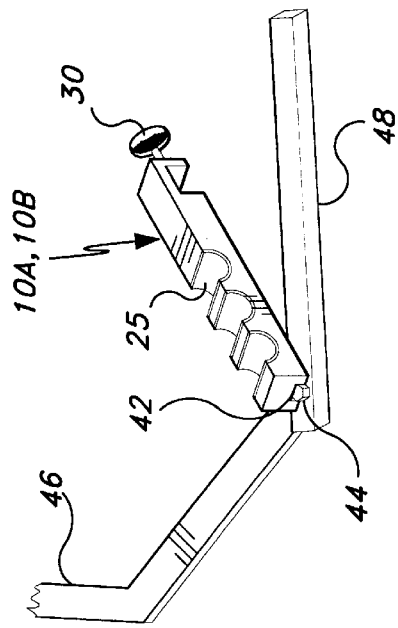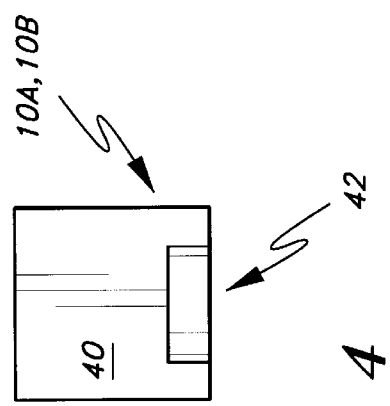
Fig. 3
Fig. 2
Fig. 4

DUAL-PURPOSE ARROW REST/WRENCH FOR TREE STAND

BACKGROUND OF THE INVENTION

1. Field of the Invention

The present invention relates to arrow holders and arrow rests. Specifically, the invention is an arrow holder attaching to a hunter's tree stand. The holder may also be used as a wrench to assist in placing the tree stand in a tree.

2. Description of the Related Art

Many other inventors have attempted to devise a satisfactory means of keeping spare arrows readily available during hunting. Many of these inventions either place the arrows where they will interfere with shooting, or cause damage to trees during use.

Several inventions are used by an archer to carry spare arrows attached to a bow. For example, U.S. Pat. No. 3,108,725, issued to James C. Ramsey, describes an arrow holder attaching to a bow comprising an upper and lower plate, each plate having rings made from expandable material, fitting around the shaft of an arrow. U.S. Pat. No. 3,490,662, issued to James C. Ramsey, describes a quiver attachment for a bow comprising a lower plate having slots which contract around an arrow to hold it in place, an upper plate having holes for the tips of the arrows, and an arrowhead guard on the upper section. U.S. Pat. No. 3,591,062, issued to Richard S. Karbo, describes a bow quiver comprising a frame attached to a bow, having a quiver hood at one end and an arrow clip at the other. U.S. Pat. No. 4,621,606, issued to Dennis M. Toth, describes a bow quiver comprising a frame having a quiver hood at one end and an arrow clip at the other. The frame is removably attached to a mounting plate, which includes a sight, and which can hold a single arrow without the quiver. U.S. Pat. No. 5,265,584, issued to Linda D. Judson et al., describes an arrow 10 quiver for a bow, comprising a frame, arrow holding assemblies, and an arrowhead guard. The arrow holding assemblies have independently pivoting arrow engaging tabs. Canadian Pat. No. 752,176, issued to John Hauch, describes a means for attaching a quiver to a bow.

Many hunters find that bow-mounted quivers like those described above encumber the bow to an undesirable extent. These arrow quivers make the bow heavy, bulky, and difficult to maneuver. Additionally, removal of one arrow can cause the other arrows to vibrate, making excessive noise and scaring the prey.

Other inventors, recognizing the problems with bow-mounted arrow carriers, devised arrow holders which mount on trees near the hunter's position. For example, U.S. Pat. No. 5,076,522, issued to Robert E. Stinson, describes a field mount for an arrow quiver comprising a body designed to receive a bow-mounted quiver, and a pointed member for holding the mount on a tree or other support. U.S. Pat. No. 5,437,377, issued to Alan F. Riemenschneider, describes a tree attachable arrow holder comprising a pair of parallel support arms for hanging the arrows by the arrowheads, and a screw member for attaching to the tree. All of these arrow holders require putting a hole in the tree, which increases the amount of time and effort required to install them, in addition to damaging the tree.

U.S. Pat. No. 5,593,121, issued to Roy E. Tuckett, describes a tree mount for arrow quivers having a mounting block having a slot for holding bow-mounted quivers. The mounting block is attached to a strap, which is secured around a tree.

U.S. Pat. No. 5,310,150, issued to Robert J. Fecko, describes an archery bow holder having one end which attaches to a tree, and a second end with a hook for holding the bow.

None of the above patents describe any means of attaching an arrow holder to a tree stand, thereby avoiding the awkwardness of quivers attached to bows, and the damage to trees and difficulty of installation of arrow holders attached to trees. Additionally, none of the above arrow holders makes any provision for facilitating the installation of a tree stand.

None of the above inventions and patents, taken either singularly or in combination, is seen to describe the instant invention as claimed. Thus a arrow rest attachment for tree stand solving the aforementioned problems is desired.

SUMMARY OF THE INVENTION

The current invention is an arrow holder attaching to the seat of a typical hunter's tree stand. The arrow holder comprises two identical components, each of which attaches to the seat at suitable locations so that each component is supporting one end of the spare arrows.

Each of the two identical supports comprises a short beam having semicircular channels in the top surface, substantially perpendicular to the beam. One end of the beam includes a clamp for securing the arrow support to the frame of a tree stand seat. The clamp comprises a channel substantially parallel to the arrow cutouts, and a thumb screw for binding the frame against the opposite wall of the channel.

The preferred embodiment has three arrow channels in each support, thereby able to hold three spare arrows. Obviously, the number of arrows held by the support could be varied without changing the basic principles of the invention. Each channel may be sound insulated by a cushion to minimize the chance of frightening wild game while lifting an arrow.

In use, two arrow supports are clamped to one beam of the tree stand's seat, so that the supports are substantially in the same horizontal plane, and parallel to each other. Spare arrows are placed over the supports so that one support holds the tail ends of all arrows, and the other support holds the head ends. When the hunter needs a spare arrow, he can get one by merely reaching down by his side, lifting an arrow, and placing it on the bow for shooting.

Preferably, the underside of each arrow support includes a slot at the end opposite the clamp, parallel to the beam, having a width slightly larger than the nuts used to secure the tree stand. This slot allows each support to be used as a wrench for tightening or loosening these nuts, thereby facilitating installation or removal of the tree stand.

Accordingly, it is a principal object of the invention to provide an arrow support which does not encumber a hunter's bow.

It is another object of the invention to provide an arrow support which does not damage trees when in use.

It is a further object of the invention to provide an arrow support which allows a hunter to quickly and quietly retrieve an arrow when needed.

Still another object of the invention is to provide an arrow support which can also serve as a wrench for installing and removing a hunter's tree stand, thereby reducing the amount of equipment the hunter must carry into the woods.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an partial environmental perspective view of one of the two identical components of an arrow rest according to the present invention being used as a wrench for placing a tree stand on a tree.

FIG. 3 is a side view of one of the two identical components of an arrow rest according to the present invention.

FIG. 4 is an end view of one of two identical components of an arrow rest according to the present invention.

Similar reference characters denote corresponding features consistently throughout the attached drawings.

DETAILED DESCRIPTION OF THE PREFERRED EMBODIMENT

Figure 1:
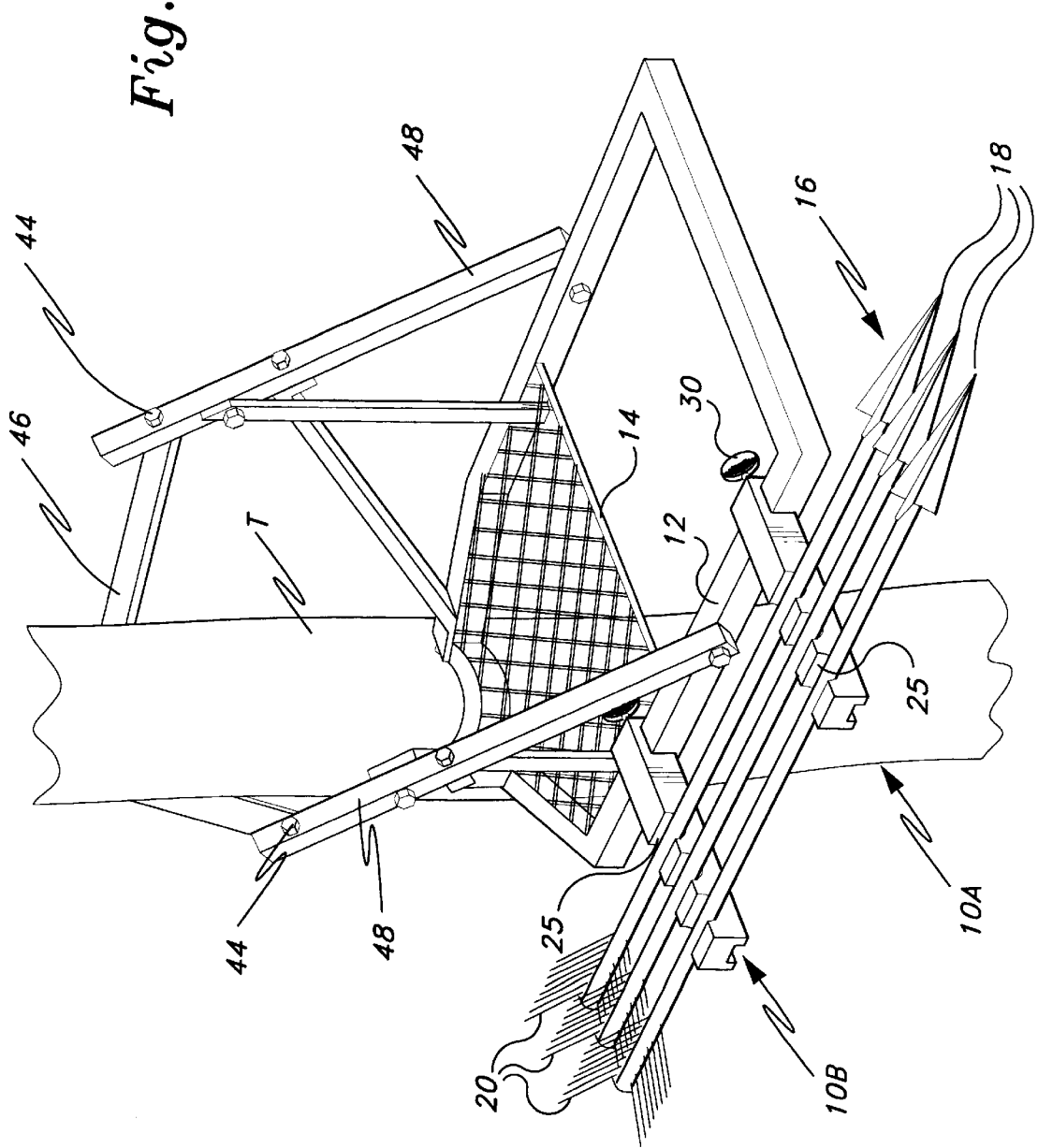
FIG. 1 is an environmental, perspective view of an arrow rest attachment for tree stand according to the present invention.

Referring to FIG. 1, the present invention is an arrow rest comprising a pair of substantially identical beams 10a, 10b, wherein each identical part is identically numbered. Each beam 10a,10b is shown spaced apart and attached to the same frame member 12 of a tree stand's seat 14. Arrows 16 may lie horizontally across both supports 10a,10b so spaced, with one support 10a holding the tip ends 18 of arrows 16, and the other support 10b holding the tail ends 20 of arrows 16.

Referring to FIG. 3, each support 10a,10b has a top surface 22, defining a plurality of semicircular channels 24 parallel to one another 10a,10b, and lying generally in the same plane. In use, channels 24 hold the shafts of the arrows in place and are dimensioned and configured to the size of the arrow shaft. The preferred embodiment includes three of channels 24, but the number of channels 24 can obviously be varied as desired without changing the basic concept of the invention. Each channel 24 may be further insulated against sound by a sound dampening material, such as a layer of foamed rubber 25, or similar cushion, which forms a barrier against any metallic ring or other sound that might be generated by contact between the metals of the beam 10a, 10b and the arrow shaft. Other materials, such as urethaned or vinyl coating, may be similarly used as appropriate for the purpose of dampening sound.

End portion 26 has a clamp 27 for securing the beam to the tree stand. The clamp 27 in the preferred embodiment comprises channel 28, substantially parallel to channels 24, and threaded fastener 30, matingly engaged within threaded hole 32 at end 34. When tightened, threaded fastener 30 secures the frame member 12 between a tip 36 of fastener 30 and channel side 38, opposite the threaded fastener 30.

Figure 5:
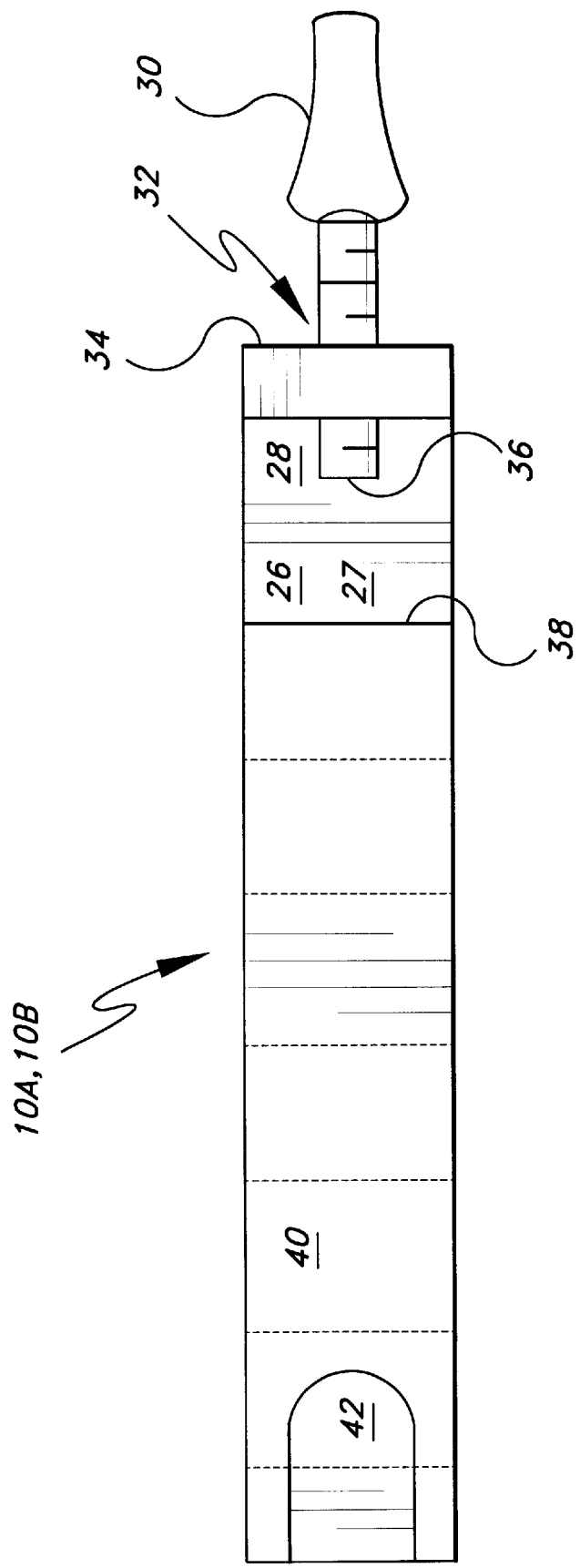
FIG. 5 is a bottom view of one of two identical components of an arrow rest according to the present invention.

Referring to FIGS. 4 and 5, end portion 40 includes slot 42. The width of slot 42 is dimensioned slightly larger than the head diameter of a hex-head or square-head bolt 44 shown in FIG. 2, that bolt being used to hold tree stand's blade 46 and support leg 48 together. As best seen in FIG. 1, tree stand 50 is shown installed around tree T, with arms 48 secured to opposite ends of blade 46 using bolts 44. In disassembling tree stand 50, it is necessary to remove at least one of the bolts 44. The slot 42 thus is sized to permit use of beam 10a,10b as a wrench for installing and removing the tree stand on a tree.

It is to be understood that the present invention is not limited to the embodiment described above, but encompasses any and all embodiments within the scope of the following claims.

We claim:

1. A tree stand, having a seat with at least one frame member, a pair of support legs, and a blade secured to said support legs by a bolt, the bolt having a head, the head having at least one pair of opposing surfaces separated by a predetermined distance, the improvement comprising:

an arrow rest, in combination with the tree stand, the arrow rest comprising:
a pair of substantially identical support beams, each support beam having a first end portion, a second end portion, and a top surface, and each support beam further comprising:
a plurality of semicircular channels in said top surface, substantially perpendicular to said support beam, and in the same horizontal plane as said support beam; and
a clamp on said first end portion, said clamp being dimensionally suited for attaching to a tree stand, said clamp having a threaded hole, a threaded fastener engaging said threaded hole, and a side opposite said threaded fastener; and
a slot within said second end portion, said slot having a width slightly wider than said distance between said opposing surfaces of said bolt head, whereby said slot may be used as a wrench to install and remove said tree stand from a tree.

2. A method of securing a tree stand to a tree using an arrow rest:

said tree stand comprising:
a seat having at least one frame member;
a pair of support legs; and
a blade secured to said support legs by a bolt, said bolt having a head, said head having at least one pair of opposing surfaces separated by a predetermined distance;

an arrow rest, comprising:
a pair of substantially identical support beams, each support beam having a first end portion, a second end portion, and a top surface, and each support beam further comprising:
a plurality of semicircular channels in said top surface, substantially perpendicular to said support beam, and in the same horizontal plane as said support beam; and
a clamp on said first end portion, said clamp being dimensionally suited for attaching to a tree stand, said clamp having a threaded hole, a threaded fastener engaging said threaded hole, and a side opposite said threaded fastener; and
a slot within said second end portion, said slot having a width slightly wider than said distance between said opposing surfaces of said bolt head;

said method of securing a tree stand to a tree using an arrow rest comprising:
removing said bolt using said slot within said arrow rest's second end;
detaching said blade from one of said pair of support arms;
placing said tree stand adjacent to a tree so that said support arms pass on either side of the tree; and
reattaching said blade to said one of said pair of support arms using said bolt.

* * * * *